US010939043B2

(12) United States Patent
Park

(10) Patent No.: US 10,939,043 B2
(45) Date of Patent: Mar. 2, 2021

(54) IMAGE PICKUP APPARATUS INCLUDING LENS ELEMENTS HAVING DIFFERENT DIAMETERS

(71) Applicant: SAMSUNG ELECTRONICS CO., LTD., Suwon-si (KR)

(72) Inventor: Kyong-tae Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/142,437

(22) Filed: Sep. 26, 2018

(65) Prior Publication Data

US 2019/0028652 A1    Jan. 24, 2019

Related U.S. Application Data

(63) Continuation of application No. 15/391,101, filed on Dec. 27, 2016, now Pat. No. 10,122,932, which is a
(Continued)

(30) Foreign Application Priority Data

Apr. 23, 2014   (KR) ........................ 10-2014-0048873

(51) Int. Cl.
 *H04N 5/232*   (2006.01)
 *G02B 13/00*   (2006.01)
(Continued)

(52) U.S. Cl.
 CPC ....... *H04N 5/23296* (2013.01); *G02B 3/0043* (2013.01); *G02B 13/001* (2013.01);
(Continued)

(58) Field of Classification Search
 None
 See application file for complete search history.

(56) References Cited

U.S. PATENT DOCUMENTS 5,365,597 A *  11/1994  Holeva ................... B07C 3/14
                                                   382/106
8,294,780 B2   10/2012  Chang
(Continued)

FOREIGN PATENT DOCUMENTS

CN         102356630 A     2/2012
CN         103051833 A     4/2013
(Continued)

OTHER PUBLICATIONS

The HTC one (M8) Review, Joshua Ho et al, Mar. 26, 2014 (Year: 2014).*
(Continued)

*Primary Examiner* — James M Hannett
(74) *Attorney, Agent, or Firm* — Sughrue Mion, PLLC

(57) ABSTRACT

An image pickup apparatus capable of performing a zooming function without increasing a thickness of the image pickup apparatus, and obtaining depth information at the same time by using lens elements having different diameters, is provided. The image pickup apparatus includes lens elements, and image pickup regions respectively disposed in correspondence to the lens elements. At least two of the lens elements have different diameters. At least two of the image pickup regions have different sizes. A smallest image pickup region among the image pickup regions having a smallest size among sizes of the image pickup regions is disposed with respect to a lens element among the lens elements having a largest diameter. A largest image pickup region among the image pickup regions having a largest size among sizes of the image pickup regions is disposed with respect to a lens element among the lens elements having a smallest diameter.

16 Claims, 13 Drawing Sheets

Related U.S. Application Data continuation of application No. 14/694,528, filed on Apr. 23, 2015, now Pat. No. 9,571,705.

(51) Int. Cl.
*G02B 3/00* (2006.01)
*G02B 27/10* (2006.01)
*G02B 27/12* (2006.01)
*H04M 1/02* (2006.01)
*H04N 5/225* (2006.01)
*H04N 13/243* (2018.01)
*H04N 13/239* (2018.01)

(52) U.S. Cl.
CPC ....... *G02B 13/009* (2013.01); *G02B 13/0015* (2013.01); *G02B 27/1066* (2013.01); *G02B 27/123* (2013.01); *H04M 1/0264* (2013.01); *H04N 5/2253* (2013.01); *H04N 5/2254* (2013.01); *H04N 5/2257* (2013.01); *H04N 5/2258* (2013.01); *H04N 5/232* (2013.01); *H04N 5/23232* (2013.01); *H04N 13/239* (2018.05); *H04N 13/243* (2018.05)

(56) References Cited

U.S. PATENT DOCUMENTS

| | | | |
|---|---|---|---|
| 8,478,123 | B2 | 7/2013 | Cao et al. |
| 8,514,491 | B2 | 8/2013 | Duparre |
| 8,520,127 | B2 | 8/2013 | Shigemitsu et al. |
| 10,560,627 | B2 | 2/2020 | Griffith et al. |
| 2003/0227556 | A1 | 12/2003 | Doyle |
| 2005/0078377 | A1 | 4/2005 | Li et al. |
| 2005/0134712 | A1 | 6/2005 | Gruhlke et al. |
| 2006/0187310 | A1 | 8/2006 | Janson, Jr. et al. |
| 2006/0275025 | A1 | 12/2006 | Labaziewicz et al. |
| 2009/0122175 | A1 | 5/2009 | Yamagata |
| 2009/0225203 | A1 | 9/2009 | Tanida et al. |
| 2010/0283863 | A1 | 11/2010 | Yamamoto |
| 2011/0019128 | A1 | 1/2011 | Takata |
| 2011/0064327 | A1 | 3/2011 | Dagher et al. |
| 2011/0069151 | A1 | 3/2011 | Orimoto |
| 2011/0074995 | A1 | 3/2011 | Rafferty et al. |
| 2012/0026366 | A1 | 2/2012 | Golan et al. |
| 2013/0033577 | A1 | 2/2013 | Lo |
| 2013/0093842 | A1 | 4/2013 | Yahata |
| 2013/0194466 | A1 | 8/2013 | Cheng et al. |
| 2013/0320195 | A1 | 12/2013 | Wang et al. |
| 2014/0009646 | A1 | 1/2014 | Attar et al. |
| 2014/0232894 | A1 | 8/2014 | Olsen et al. |
| 2015/0009354 | A1 | 1/2015 | Venkataraman et al. |
| 2015/0146054 | A1 | 5/2015 | Vaartstra et al. |
| 2015/0304557 | A1 | 10/2015 | Choi |
| 2015/0362698 | A1 | 12/2015 | Lansel |
| 2016/0241751 | A1 | 8/2016 | Park |
| 2016/0360109 | A1 | 12/2016 | Laroia et al. |

FOREIGN PATENT DOCUMENTS

| | | |
|---|---|---|
| CN | 103268648 A | 8/2013 |
| EP | 2182718 A1 | 5/2010 |
| EP | 2582128 A2 | 4/2013 |
| JP | 2005031466 A | 2/2005 |
| JP | 2009-206922 A | 9/2009 |
| KR | 1020110045549 A | 5/2011 |
| KR | 10-1230949 B1 | 2/2013 |
| KR | 1020130039676 A | 4/2013 |
| KR | 10-2015-0033095 A | 4/2015 |
| WO | 2008016474 A2 | 2/2008 |
| WO | 2010147609 A1 | 12/2010 |
| WO | 2012166162 A1 | 12/2012 |

OTHER PUBLICATIONS

Communication dated Jun. 6, 2019, issued by the European Patent Office in counterpart European Application No. 19161753.9.
Communication dated Jun. 25, 2018, issued by the State Intellectual Property Office of the People's Republic of China in counterpart Chinese Patent Application No. 201580021388.6.
Search Report dated Aug. 18, 2015, issued by the International Searching Authority in counterpart International Application No. PCT/KR2015/003967 (PCT/ISA/210).
Written Opinion dated Aug. 18, 2015, issued by the International Searching Authority in counterpart International Application No. PCT/KR2015/003967 (PCT/ISA/237).
Communication dated Aug. 10, 2017, from the European Patent Office in counterpart European Application No. 15783604.0.
Communication dated Apr. 23, 2020 from the Indian Patent Office in application No. 201637039762.
Communication dated Apr. 8, 2020 from the European Patent Office in application No. 19161753.9.
Communication dated Feb. 19, 2020 from the State Property Office of the P.R.China in application No. 201580021388.6.
Communication dated Sep. 7, 2020, issued by the State Intellectual Property Office of P.R. China in counterpart Chinese Application No. 201811399434.8.

* cited by examiner

IMAGE PICKUP APPARATUS INCLUDING LENS ELEMENTS HAVING DIFFERENT DIAMETERS

CROSS-REFERENCE TO RELATED APPLICATION

This application is a continuation application of U.S. patent application Ser. No. 15/391,101, filed Dec. 27, 2016, in the U.S. Patent and Trademark Office, which is a continuation application of U.S. patent application Ser. No. 14/694,528, filed on Apr. 23, 2015, now patented as U.S. Pat. No. 9,571,705 on Feb. 14, 2017, which claims priority from Korean Patent Application No. 10-2014-0048873, filed on Apr. 23, 2014, in the Korean Intellectual Property Office, the disclosures of which are incorporated herein by reference in their entireties.

BACKGROUND

1. Field

Apparatuses consistent with exemplary embodiments relate to an image pickup apparatus including lens elements having different diameters.

2. Description of Related Art

Because thicknesses of mobile devices, such as mobile phones, are being continuously reduced, there is a demand to reduce thicknesses of optical systems of cameras disposed in mobile devices. When a thickness of an optical system is reduced, a focal length of the optical system is reduced, and thus a size of an image sensor is reduced. As a result, quality of an image picked up via the optical system may be deteriorated. The reason for the deterioration is that a number of pixels decreases as the size of an image is reduced. However, if a size of pixels of an image sensor is reduced in correspondence to the size reduction of the image sensor, images having sufficiently high resolutions may be obtained. Therefore, various attempts are being made to reduce pixel pitch of an image sensor. For example, a pixel pitch of current image sensors has been reduced to about 1 μm.

Meanwhile, because a thickness of a camera in a mobile device is limited, a unifocal lens with a short focal length is generally employed instead of a zoom lens with variable focal lengths. Therefore, it may be difficult for a camera of a mobile device to provide a zooming function. Most cameras in mobile devices provide a digital zooming function instead of an optical zooming function. In other words, because digital zoom is a function for magnifying a portion of an original image picked up by a camera merely via signal processing, quality of a magnified image may be deteriorated as an angle of view of the magnified image is narrowed.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an image pickup apparatus including lens elements, and image pickup regions respectively disposed in correspondence to the lens elements. At least two of the lens elements have different diameters, and at least two of the image pickup regions have different sizes. A smallest image pickup region among the image pickup regions having a smallest size among sizes of the image pickup regions is disposed with respect to a lens element among the lens elements having a largest diameter, and a largest image pickup region among the image pickup regions having a largest size among sizes of the image pickup regions is disposed with respect to a lens element among the lens elements having a smallest diameter.

The image pickup regions may include image sensors that are physically separated from each other.

At least two of the image pickup regions may have different pixel pitches, and a pixel pitch of an image pickup region among the image pickup regions may decrease as a diameter of a respective lens element among the lens elements increases.

The image pickup regions may be logically divided regions in a single image sensor.

The at least two of the lens elements may be configured to form light spots having different sizes on the respective image pickup regions.

The image pickup apparatus may be configured to extract depth information from images obtained via the lens elements and the respective image pickup regions.

The at least two of the lens elements may include a first lens element having a first diameter, a second lens element having a second diameter larger than the first diameter, and a third lens element having a third diameter larger than the second diameter. The at least two of the image pickup regions may include a first image pickup region corresponding to the first lens element and having a first size, a second image pickup region corresponding to the second lens element and having the first size, and a third image pickup region corresponding to the third lens element and having a second size smaller than the first size. The first image pickup region may have a first pixel pitch, a second image pickup region may have a second pixel pitch smaller than the first pixel pitch, and a third image pickup region may have a third pixel pitch smaller than the second pixel pitch.

The at least two of the lens elements may include a first lens element having a first diameter, a second lens element having the first diameter, and a third lens element having a second diameter larger than the first diameter. The at least two of the image pickup regions may include a first image pickup region corresponding to the first lens element and having a first size, a second image pickup region corresponding to the second lens element and having the first size, and a third image pickup region corresponding to the third lens element and having a second size smaller than the first size. The first and second image pickup regions may have a first pixel pitch, and a third image pickup region may have a second pixel pitch smaller than the first pixel pitch.

The first through third lens elements may be linearly disposed in a horizontal direction when viewed from a front or rear of the image pickup apparatus, the first lens element may be disposed between the second lens element and the third lens element, and the first image pickup region may be disposed between the second image pickup region and the third image pickup region.

The first through third lens elements may be linearly disposed in a horizontal direction when viewed from a front or rear of the image pickup apparatus, the third lens element may be disposed between the first lens element and the second lens element, and the third image pickup region may be disposed between the first image pickup region and the second image pickup region.

The at least two of the lens elements may include a first lens element having a first diameter, a second lens element having a second diameter larger than the first diameter, a third lens element having the second diameter, a fourth lens element having a third diameter larger than the second diameter, and a fifth lens element having the third diameter.

The at least two of the image pickup regions may include a first image pickup region corresponding to the first lens element and having a first size, a second image pickup region corresponding to the second lens element and having the first size, a third image pickup region corresponding to the third lens element and having the first size, a fourth image pickup region corresponding to the fourth lens element and having a second size smaller than the first size, and a fifth image pickup region corresponding to the fifth lens element and having the second size. The first image pickup region may have a first pixel pitch, the second and third image pickup regions may have a second pixel pitch smaller than the first pixel pitch, and the fourth and fifth image pickup regions may have a third pixel pitch smaller than the second pixel pitch.

The first through fifth lens elements may be linearly disposed in a horizontal direction when viewed from a front or rear of the image pickup apparatus. The first lens element may be disposed between the second lens element and the third lens element, the second lens element may be disposed between the first lens element and the fourth lens element, and the third lens element may be disposed between the first lens element and the fifth lens element.

The at least two of the lens elements may include a first lens element having a first diameter, second through fifth lens elements having a second diameter larger than the first diameter, and sixth through ninth lens elements having a third diameter larger than the second diameter. The at least two of the image pickup regions may include first through fifth image pickup regions corresponding to the first through fifth lens elements and having a first size, and sixth through ninth image pickup regions corresponding to the sixth through ninth lens elements and have a second size smaller than the first size.

The sixth through ninth lens elements may be respectively disposed on four vertices of a quadrangle on a surface of the image pickup apparatus, the second through fifth lens elements may be respectively disposed at centers of four sides of the quadrangle, and the first lens element may be disposed in a center of the quadrangle.

The at least two of the lens elements may include first through third lens elements having a first diameter, and fourth and fifth lens elements having a second diameter larger than the first diameter.

The first through third lens elements may be linearly disposed in a first direction when viewed from a front or rear of the image pickup apparatus, and the fourth and fifth lens elements may be linearly disposed in a second direction perpendicular to the first direction.

According to an aspect of another exemplary embodiment image pickup apparatus including a first lens element having a first diameter, a second lens element having a second diameter larger than the first diameter; a first image pickup region of a first size disposed in correspondence to the first lens element, and a second image pickup region of a second size smaller than the first size disposed in correspondence to the second lens element.

The first image pickup region may have a first pixel pitch, and the second image pickup region may have a second pixel pitch smaller than the first pixel pitch.

The image pickup apparatus may further include a third lens element having a third diameter larger than the first diameter and smaller than the second diameter, and a third image pickup region of the first size disposed in correspondence to the third lens element, the third image pickup region having a third pixel pitch smaller than the first pixel pitch and larger than the second pixel pitch.

The image pickup apparatus may further include a third lens element having the first diameter; and a third image pickup region of the first size disposed in correspondence to the third lens element, the third image pickup region having the first pixel pitch.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
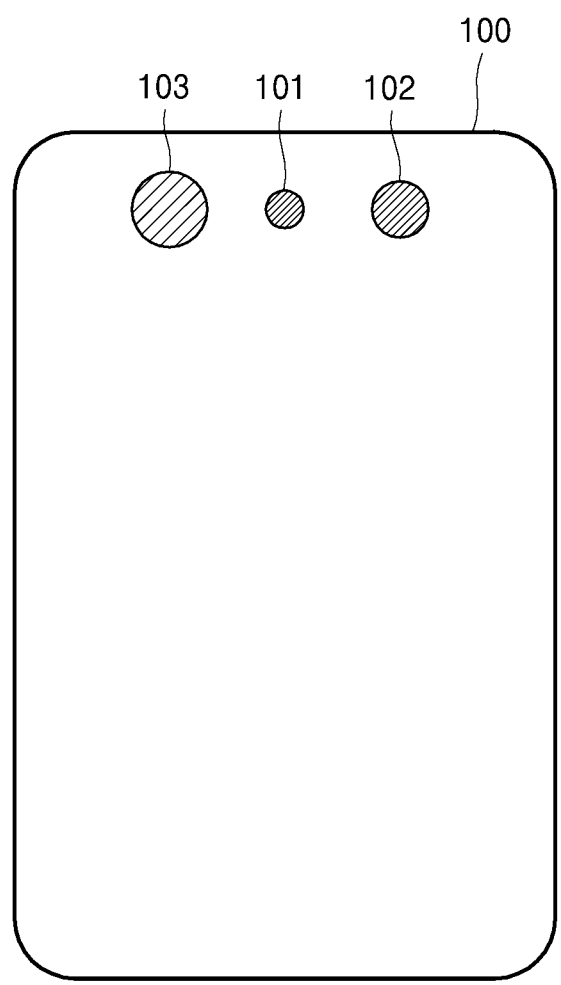
FIG. 1A is a schematic diagram showing a structure of an image pickup apparatus according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list. It will be understood that when an element or layer is referred to as being "on" another element or layer, the element or layer can be directly on the other element or layer or intervening elements or layers may be present thereon.

FIG. 1A is a schematic diagram showing a structure of an image pickup apparatus 100 according to an exemplary embodiment. For example, the image pickup apparatus 100 may be a mobile device, such as a mobile phone, a tablet personal computer (PC), or a laptop PC. Referring to FIG. 1A, the image pickup apparatus 100 includes a first lens element 101, a second lens element 102, and a third lens element 103 having different diameters. In this example, the first lens element 101 has a first diameter, which is the smallest diameter, the second lens element 102 has a second diameter, which is larger than the first diameter, and the third lens element 103 has a third diameter, which is larger than the second diameter. Furthermore, the first through third lens elements 101, 102, and 103 are linearly disposed in a horizontal direction, when viewed from a rear, front, or surface of the image pickup apparatus 100. In this example, the third lens element 103 is disposed on the left, the first lens element 101 is disposed in the center, and the second lens element 102 is disposed on the right.

Figure 1B:
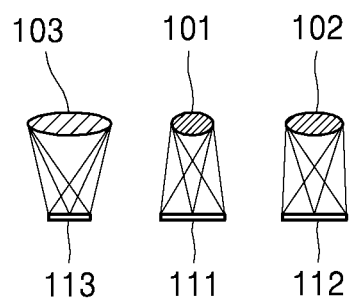
FIG. 1B is a schematic cross-sectional diagram showing an arrangement of lens elements and image pickup regions of the image pickup apparatus shown in FIG. 1A.

FIG. 1B is a schematic cross-sectional diagram showing an arrangement of the first through third lens elements 101, 102, and 103 and first through third image pickup regions 111, 112, and 113 of the image pickup apparatus 100 shown in FIG. 1A. Referring to FIG. 1B, the first through third image pickup regions 111, 112, and 113 respectively corresponding to the first through third lens elements 101, 102, and 103 are disposed. For example, the first image pickup region 111 is disposed on a focal plane of the first lens element 101, the second image pickup region 112 is disposed on a focal plane of the second lens element 102, and the third image pickup region 113 is disposed on a focal plane of the third lens element 103. Therefore, the first through third image pickup regions 111, 112, and 113 form images by using light beams focused by the first through third lens elements 101, 102, and 103 respectively corresponding thereto. The first through third image pickup regions 111, 112, and 113 may include separate image sensors that are physically separated from one another, respectively. An image sensor may be a charge-coupled device (CCD) image sensor or a complementary metal oxide semiconductor (CMOS) image sensor.

The first through third lens elements 101, 102, and 103 may have the same focal length. Alternatively, as long as an internal space of the image pickup apparatus 100 allows, the first through third lens elements 101, 102, and 103 may have focal lengths that are different from one another. However, because differences between focal lengths may be insignificant due to a narrow space inside the image pickup apparatus 100, brightnesses of the first through third lens elements 101, 102, and 103 may be determined based on diameters of the first through third lens elements 101, 102, and 103. For example, an F number of the first lens element 101 with the smallest diameter may be 2.2, an F number of the second lens element 102 may be 1.5, and an F number of the third lens element 103 with the largest diameter may be 1.0. A theoretical size of a light spot focused by a lens element may be determined based on an F number of the lens element. In detail, as the F number of the lens element decreases (that is, as a brightness of the lens element increases), the size of the light spot may decrease. Therefore, a size of a light spot formed by the third lens element 103 with the smallest F number may be the smallest.

Figure 1C:
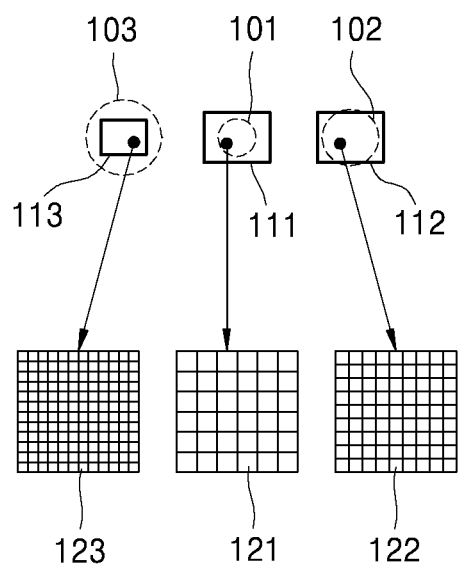
FIG. 1C is a diagram showing sizes and pixel pitches of the image pickup regions of the image pickup apparatus shown in FIG. 1A.

FIG. 1C is a diagram showing sizes and pixel pitches of the first through third image pickup regions 111, 112, and 113 of the image pickup apparatus 100 shown in FIG. 1A. Referring to FIG. 1C, the sizes of the first through third image pickup regions 111, 112, and 113 may be different from one another. In this example, the first and second image pickup regions 111 and 112 have the same first size, whereas the third image pickup region 113 has a second size smaller than the first size. As described above, because the focal lengths of the first through third lens elements 101, 102, and 103 are identical or similar to one another, angles of view are determined based on the sizes of the image pickup regions 111, 112, and 113. In this example, images obtained via the first and second image pickup regions 111 and 112 have the same first angle of view, whereas an image obtained via the third image pickup region 113 has a second angle of view narrower than the first angle of view. Therefore, the third image pickup region 113 provides a relative telescopic zoom, compared to the first and second image pickup regions 111 and 112. In other words, the first and second image pickup regions 111 and 112 provide a first zoom corresponding to a relatively wide angle of view, whereas the third image pickup region 113 provides a second zoom corresponding to a relatively telescopic angle of view. Therefore, the image pickup apparatus 100 provides a zoom function including the first zoom (wide angle) and the second zoom (telescopic angle).

Furthermore, FIG. 1C shows pixels 121, 122, and 123, which are respectively same-sized portions of the first through third image pickup regions 111, 112, and 113 magnified at the same magnification. As shown in FIG. 1C, the first through third image pickup regions 111, 112, and 113 have different pixel pitches from one another. In this example, the first image pickup region 111 has a first pixel pitch, the second image pickup region 112 has a second pixel pitch smaller than the first pixel pitch, and the third image pickup region 113 has a third pixel pitch smaller than the second pixel pitch. In other words, as the diameters of the lens elements 101, 102, and 103 respectively corresponding to the image pickup regions 111, 112, and 113 increase, the pixel pitches of the image pickup regions 111, 112, and 113 decrease. Furthermore, as the diameters of the lens elements 101, 102, and 103 respectively corresponding to the image pickup regions 111, 112, and 113 decrease, the pixel pitches of the image pickup regions 111, 112, and 113 increase. For example, the first pixel pitch of the first image pickup region 111 corresponding to the first lens element 101 having the largest F number is the largest, whereas the third pixel pitch of the third image pickup region 113 corresponding to the third lens element 103 having the smallest F number is the smallest.

A resolution of an image may be proportional to a modulation transfer function (MTF) of an optical system and frequency response characteristics of pixels, in which the MTF increases as an F number of an optical system decreases. Therefore, the resolution of the image may be improved by reducing the F number of the optical system. However, even if a size of a light spot is reduced, if a pixel pitch is too large, the response characteristics of pixels may be deteriorated, and thus the image resolution may not be improved. Therefore, the image resolution may be improved when the pixel pitch is reduced in correspondence to the reduction of the light spot.

According to the exemplary embodiment, the light spot formed by the third lens element 103 having the smallest F number may have the smallest size, whereas a light spot formed by the first lens element 101 having the largest F number may have the largest size. Furthermore, the first image pickup region 111 corresponding to the first lens element 101 having the largest F number has the largest pixel pitch, whereas the third image pickup region 113 corresponding to the third lens element 103 having the smallest F number has the smallest pixel pitch. As a result, an image formed by the third lens element 103 and the third image pickup region 113 may have the highest resolution, whereas an image formed by the first lens element 101 and the first image pickup region 111 may have the lowest resolution. As described above, the third lens element 103 and the third image pickup region 113 function as telescopic zoom. Therefore, a quality of an image with a narrow angle of view may be improved by improving a resolution of the image formed by the third lens element 103 and the third image pickup region 113. Therefore, the image pickup apparatus 100 may provide the zoom function that does not cause image quality deterioration when switching between a wide angle zoom and a telescopic zoom, without an optical system having variable focal lengths.

Meanwhile, because the first and second image pickup regions 111 and 112 have the same size, first and second images respectively obtained via the first and second image pickup regions 111 and 112 have the same angle of view, and a parallax effect is obtained due to a difference between locations of the first and second lens elements 101 and 102. Therefore, the image pickup apparatus 100 may extract depth information by using the first and second images having the same angle of view and the parallax effect. In other words, a set of the first lens element 101 and the first image pickup region 111 and a set of the second lens element 102 and the second image pickup region 112 may function as a stereoscopic camera. Furthermore, more precise depth information may be extracted by using a high resolution third image obtained via the third image pickup region 113. For example, because centers of first and second images may correspond to the third image with a narrow angle of view, depth information for a center angle of view may be extracted by using a center portion of the second image, which has a higher resolution than the first image, and the third image, whereas depth information for a peripheral angle of view may be extracted by using a peripheral portion of the first image and a peripheral portion of the second image.

Furthermore, because the second image has the same angle of view as the first image and has a higher resolution than the first image, the image pickup apparatus 100 may select and display the second image to display an image of the first zoom to a user. On the other hand, because the third image has a higher resolution than the second image and has a narrower angle of view than the second image, the image pickup apparatus 100 may replace the center portion of the second image, which corresponds to the third image, with the third image, and display the modified image to a user as the image of the first zoom. Furthermore, the image pickup apparatus 100 may provide a digital zoom between the first zoom and the second zoom via signal processing. Here, to provide a smooth digital zoom between the first zoom and the second zoom, the second image and the third image having relatively high resolutions may be used.

As described above, the image pickup apparatus 100 may simultaneously obtain a plurality of images with different angles of view. Therefore, an optical zoom function may be embodied without increasing a thickness of the image pickup apparatus 100. Furthermore, a high resolution may be obtained with respect to an image having a narrow angle of view.

Although it is described above that the image pickup apparatus 100 includes the three lens elements 101, 102, and 103 and the three image pickup regions 111, 112, and 113 in the exemplary embodiments shown in FIGS. 1A through 1C, it is merely an example, and an inventive concept is not limited thereto. For example, two lens elements and two image pickup regions, or four or more lens elements and four or more image pickup regions, may be disposed in various ways. Furthermore, diameters of lens elements, sizes of image pickup regions, and pixel pitches of the image pickup regions may vary as an occasion demands. Although various exemplary embodiments are described below, the inventive concept is not limited to the exemplary embodiments described below.

Figure 2A:
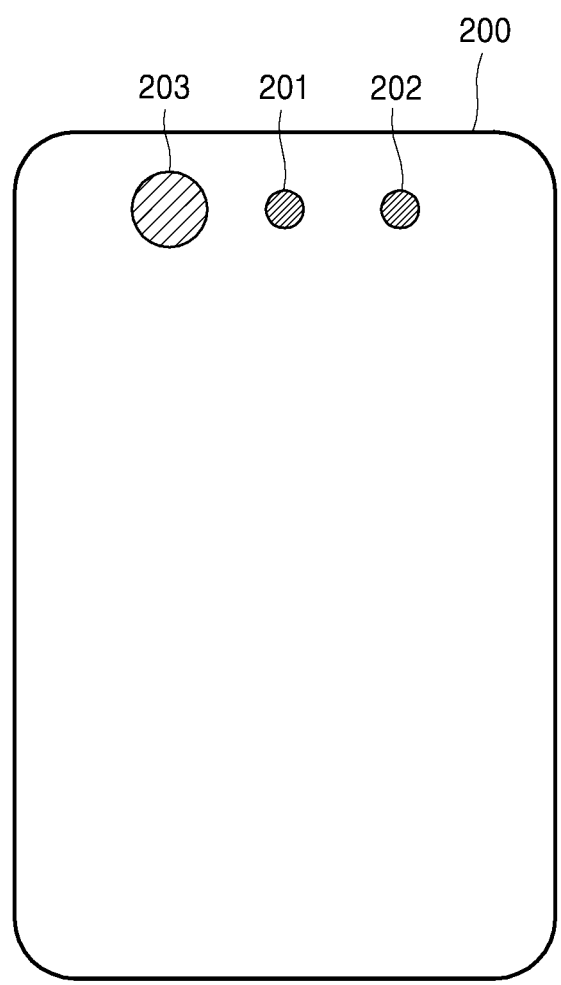
FIG. 2A is a schematic diagram showing a structure of an image pickup apparatus according to another exemplary embodiment.
Figure 2B:
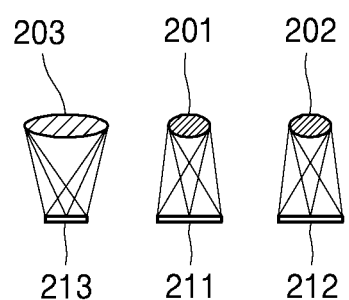
FIG. 2B is a schematic cross-sectional diagram showing an arrangement of lens elements and image pickup regions of the image pickup apparatus shown in FIG. 2A.
Figure 2C:
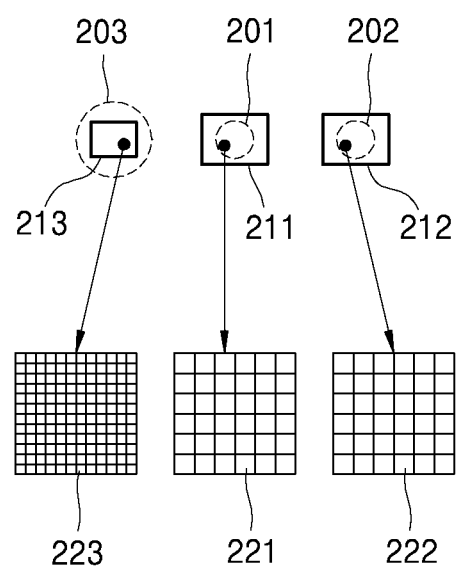
FIG. 2C is a diagram showing sizes and pixel pitches of the image pickup regions of the image pickup apparatus shown in FIG. 2A.

FIG. 2A is a schematic diagram showing a structure of an image pickup apparatus 200 according to another exemplary embodiment, FIG. 2B is a schematic diagram showing an arrangement of first through third lens elements 201, 202, and 203 and first through third image pickup regions 211, 212, and 213 of the image pickup apparatus 200 shown in FIG. 2A, and FIG. 2C is a diagram showing sizes and pixel pitches of the first through third image pickup regions 211, 212, and 213 of the image pickup apparatus 200 shown in FIG. 2A.

Referring to FIG. 2A, the image pickup apparatus 200 includes the first lens element 201 having a first diameter, the second lens element 202 having the first diameter, and the third lens element 203 having a second diameter. In other words, the first and second lens elements 201 and 202 have the same diameter, whereas the third lens element 203 has a diameter larger than that of the first and second lens elements 201 and 202. Therefore, because the third lens element 203 has the smallest F number, a light spot formed by the third lens element 203 has the smallest size. Furthermore, the first through third lens elements 201, 202, and 203 are linearly disposed in a horizontal direction, when viewed from a rear, front, or surface of the image pickup apparatus 200. In this example, the third lens element 203 is disposed on the left, the first lens element 201 is disposed in the center, and the second lens element 202 is disposed on the right.

Referring to FIGS. 2B and 2C, the first through third image pickup regions 211, 212, and 213 respectively corresponding to the first through third lens elements 201, 202, and 203 are disposed. The first through third image pickup regions 211, 212, and 213 may include separate image sensors that are physically separated from one another, respectively. In this example, the first and second image pickup regions 211 and 212 have the same first size, whereas the third image pickup region 213 has a second size smaller than the first size. Therefore, images obtained via the first and second image pickup regions 211 and 212 have the same first angle of view, whereas an image obtained via the third image pickup region 213 has a second angle of view narrower than the first angle of view.

Furthermore, referring to pixels 221, 222, and 223 shown in FIG. 2C, the first and second image pickup regions 211 and 212 have the same first pixel pitch, whereas the third image pickup region 213 has a second pixel pitch smaller than the first pixel pitch. Therefore, the images obtained via the first and second image pickup regions 211 and 212 have lower resolutions than the image obtained via the third image pickup region 213. However, resolutions of the images obtained via the first and second image pickup regions 211 and 212 may be improved by using a resolution improving technique, e.g., super resolution. For example, a single image with improved resolution may be generated by synthesizing two images respectively obtained via the first and second image pickup regions 211 and 212. By using the super resolution technique, an image may be smoothly processed when a digital zoom function for generating an image having an angle of view between a first angle of view and a second angle of view is performed. Other operations and functions of the image pickup apparatus 200 may be identical to those described above with reference to FIGS. 1A through 1C.

Figure 3A:
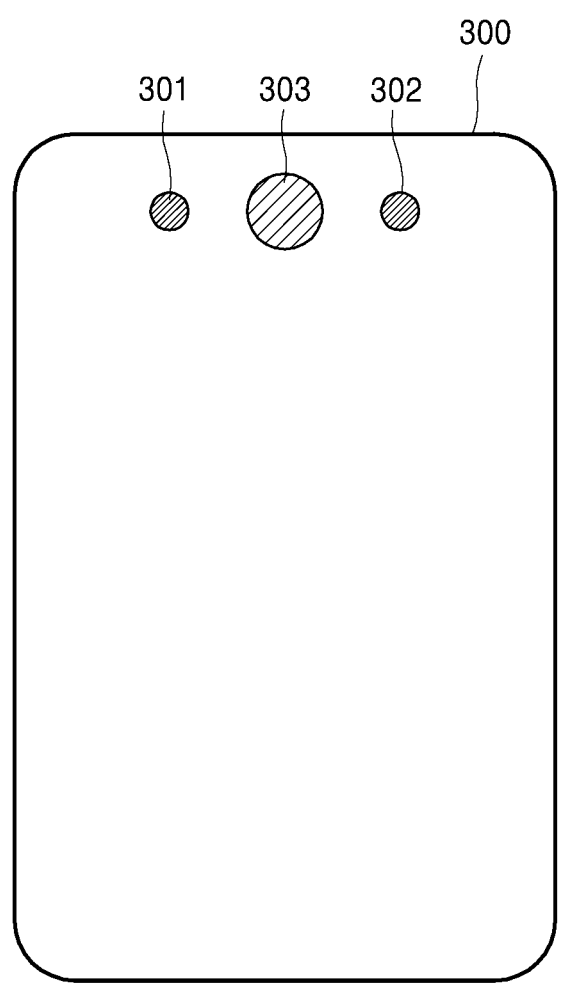
FIG. 3A is a schematic diagram showing a structure of an image pickup apparatus according to another exemplary embodiment.
Figure 3B:
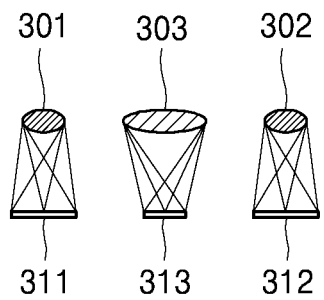
FIG. 3B is a schematic cross-sectional diagram showing an arrangement of lens elements and image pickup regions of the image pickup apparatus shown in FIG. 3A.
Figure 3C:
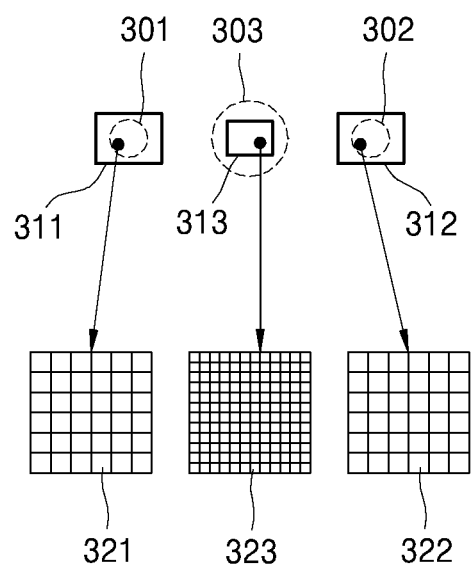
FIG. 3C is a diagram showing sizes and pixel pitches of the image pickup regions of the image pickup apparatus shown in FIG. 3A.

FIG. 3A is a schematic diagram showing a structure of an image pickup apparatus 300 according to another exemplary embodiment, FIG. 3B is a schematic cross-sectional diagram showing an arrangement of first through third lens elements 301, 302, and 303 and first through third image pickup regions 311, 312, and 313 of the image pickup apparatus 300 shown in FIG. 3A, and FIG. 3C is a diagram showing sizes and pixel pitches of the first through third image pickup regions 311, 312, and 313 of the image pickup apparatus 300 shown in FIG. 3A.

Referring to FIG. 3A, the image pickup apparatus 300 includes a first lens element 301 having a first diameter, a second lens element 302 having the first diameter, and a third lens element 303 having a second diameter. In other words, the first and second lens elements 301 and 302 have the same diameter, whereas the third lens element 303 has a diameter larger than that of the first and second lens elements 301 and 302. Therefore, because the third lens element 303 has the smallest F number, a light spot formed by the third lens element 303 has the smallest size. Furthermore, the first through third lens elements 301, 302, and 303 are linearly disposed in a horizontal direction, when viewed from a rear, front, or surface of the image pickup apparatus 300. In this example, the first lens element 301 is disposed on the left, the third lens element 303 is disposed in the center, and the second lens element 302 is disposed on the right.

Referring to FIGS. 3B and 3C, the first through third image pickup regions 311, 312, and 313 respectively corresponding to the first through third lens elements 301, 302, and 303 are disposed. The first through third image pickup regions 311, 312, and 313 may have different sizes and pixel pitches from one another. In this example, the first and second pickup regions 311 and 312 have the same first size, whereas the third image pickup region 313 has a second size smaller than the first size. Therefore, images obtained via the first and second image pickup regions 311 and 312 have the same first angle of view, whereas an image obtained via the third image pickup region 313 has a second angle of view narrower than the first angle of view. Furthermore, referring to pixels 321, 322, and 323 shown in FIG. 3C, the first and second image pickup regions 311 and 312 have the same first pixel pitch, whereas the third image pickup region 313 has a second pixel pitch smaller than the first pixel pitch. Therefore, the image obtained via the third image pickup region 313 has a higher resolution than the images obtained via the first and second image pickup regions 311 and 312.

The image pickup apparatus 300 shown in FIG. 3A has a structure similar to the structure of the image pickup apparatus 200 shown in FIG. 2A, in which locations of the first through third lens elements 301, 302, and 303 and locations of the first through third image pickup regions 311, 312, and 313 of the image pickup apparatus 300 are different from locations of the first through third lens elements 201, 202, and 203 and locations of the first through third image pickup regions 211, 212, and 213 of the image pickup apparatus 200. For example, the third lens element 303 is disposed at the center, and the first lens element 301 and the second lens element 302 are disposed at either side of the third lens element 303. Therefore, a distance between the first lens element 301 and the second lens element 302 is larger compared to the exemplary embodiment shown in FIG. 2A, and thus parallax may increase. As a result, resolution and precision of depth information may be improved.

Figure 4A:
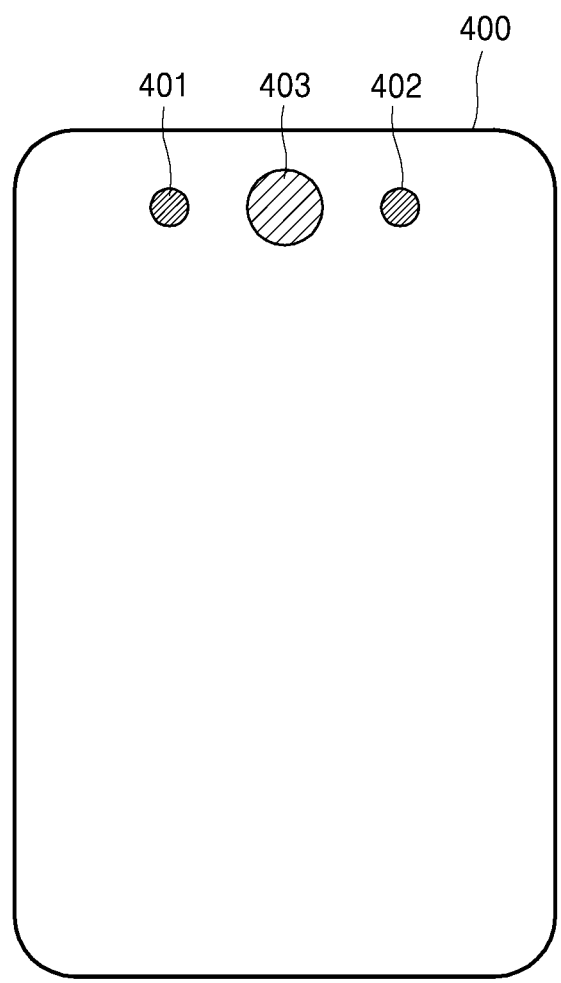
FIG. 4A is a schematic diagram showing a structure of an image pickup apparatus according to another exemplary embodiment.
Figure 4B:
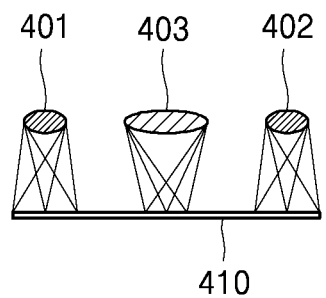
FIG. 4B is a schematic cross-sectional diagram showing an arrangement of lens elements and image pickup regions of the image pickup apparatus shown in FIG. 4A.
Figure 4C:
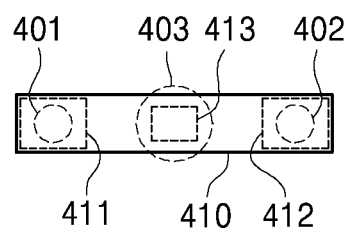
FIG. 4C is a diagram showing sizes of the image pickup regions of the image pickup apparatus shown in FIG. 4A.

FIG. 4A is a schematic diagram showing a structure of an image pickup apparatus 400 according to another exemplary embodiment, FIG. 4B is a schematic cross-sectional diagram showing an arrangement of first through third lens elements 401, 402, and 403 and first through third image pickup regions 411, 412, and 413 of the image pickup apparatus 400 shown in FIG. 4A, and FIG. 4C is a diagram showing sizes of the first through third image pickup regions 411, 412, and 413 of the image pickup apparatus 400 shown in FIG. 4A.

Referring to FIG. 4A, the image pickup apparatus 400 includes the first lens element 401 having a first diameter, the second lens element 402 having the first diameter, and the third lens element 403 having a second diameter. In other words, the first and second lens elements 401 and 402 have the same diameter, whereas the third lens element 403 has a diameter larger than that of the first and second lens elements 401 and 402. Therefore, because the third lens element 403 has the smallest F number, a light spot formed by the third lens element 403 has the smallest size. Furthermore, the first through third lens elements 401, 402, and 403 are linearly disposed in a horizontal direction, when viewed from a rear, front, or surface of the image pickup apparatus 400. In this example, the first lens element 401 is disposed on the left, the third lens element 403 is disposed in the center, and the second lens element 402 is disposed on the right.

Referring to FIGS. 4B and 4C, the first through third image pickup regions 411, 412, and 413 respectively corresponding to the first through third lens elements 401, 402, and 403 are disposed. Here, the first through third image pickup regions 411, 412, and 413 are logically divided regions in a single image sensor 410. For example, as shown in FIG. 4C, in the single image sensor 410, the first image pickup region 411 is a region divided to detect a light beam focused by the first lens element 401, the second image pickup region 412 is a region divided to detect a light beam focused by the second lens element 402, and the third image pickup region 413 is a region divided to detect a light beam focused by the third lens element 403. In this case, the first through third image pickup regions 411, 412, and 413 may have the same pixel pitch.

The first through third image pickup regions 411, 412, and 413 may have different sizes from one another. In this example, the first and second image pickup regions 411 and 412 have the same first size, whereas the third image pickup region 413 has a second size smaller than the first size. To this end, an image processing unit of the image pickup apparatus 400 may split pixels in the image sensor 410 into the first through third image pickup regions 411, 412, and 413 and a dummy region, based on preset coordinates. Furthermore, the image processing unit may generate a first image by using only signals generated by the first image pickup region 411, generate a second image by using only signals generated by the second image pickup region 412, generate a third image by using only signals generated by the third image pickup region 413, and ignore signals generated by the dummy region.

According to the exemplary embodiment, because the single image sensor 410 is used for the first through third lens elements 401, 402, and 403, instead of using separate image sensors, an assembly process may be simplified, and fabrication costs may be reduced. The structure of the single image sensor 410 described above with reference to FIGS. 4A through 4C may also be applied to other exemplary embodiments.

Figure 5A:
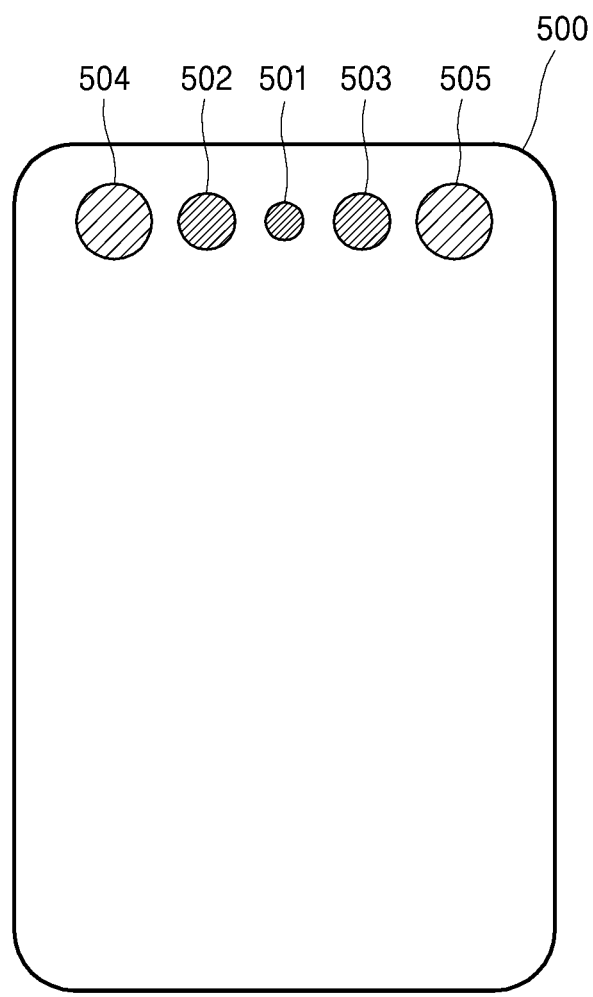
FIG. 5A is a schematic diagram showing a structure of an image pickup apparatus according to another exemplary embodiment.
Figure 5B:
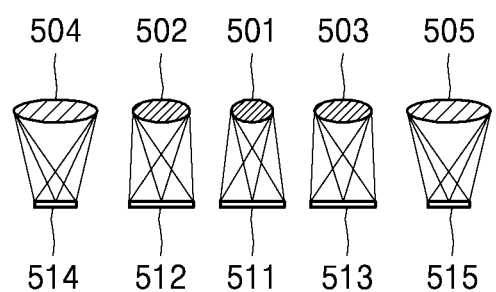
FIG. 5B is a schematic cross-sectional diagram showing an arrangement of lens elements and image pickup regions of the image pickup apparatus shown in FIG. 5A.
Figure 5C:
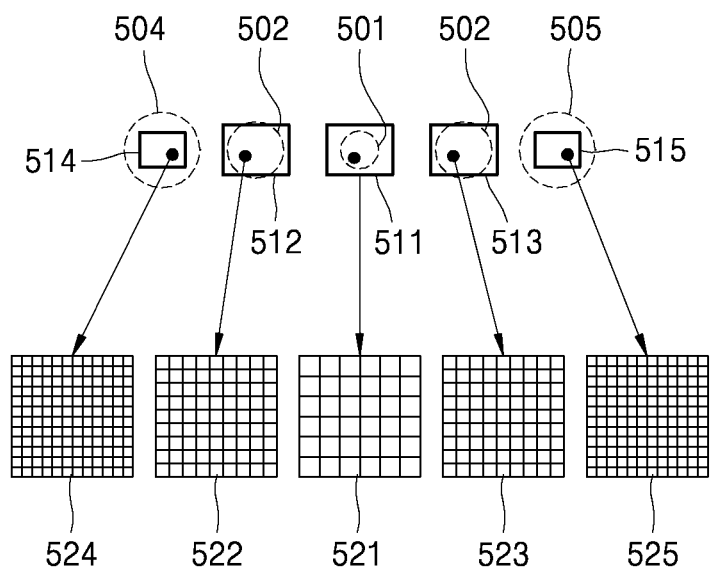
FIG. 5C is a diagram showing sizes and pixel pitches of the image pickup regions of the image pickup apparatus shown in FIG. 5A.

FIG. 5A is a schematic diagram showing a structure of an image pickup apparatus 500 according to another exemplary embodiment, FIG. 5B is a schematic cross-sectional diagram showing an arrangement of first through fifth lens elements 501, 502, 503, 504, and 505 and first through fifth image pickup regions 511, 512, 513, 514, and 515 of the image pickup apparatus 500 shown in FIG. 5A, and FIG. 5C is a diagram showing sizes and pixel pitches of the first through fifth image pickup regions 511, 512, 513, 514, and 515 of the image pickup apparatus 500 shown in FIG. 5A.

Referring to FIG. 5A, the image pickup apparatus 500 includes a first lens element 501 having a first diameter, a second lens element 502 having a second diameter larger than the first diameter, a third lens element 503 having the second diameter, a fourth lens element 504 having a third diameter larger than the second diameter, and a fifth lens element 505 having the third diameter. In other words, the first lens element 501 has a smallest diameter. Furthermore, the second and third lens elements 502 and 503 have a diameter larger than that of the first lens element 501, and the fourth and fifth lens elements 504 and 505 have the largest diameter. Therefore, the first lens element 501 has the largest F number, whereas the fourth and fifth lens elements 504 and 505 have the smallest F number. The first through fifth lens elements 501, 502, 503, 504, and 505 are linearly disposed in a horizontal direction, when viewed from a rear, front, or surface of the image pickup apparatus 500. In this example, the first lens element 501 is disposed at the center, the second and third lens elements 502 and 503 are disposed at either side of the first lens element 501, and the fourth and fifth lens elements 504 and 505 are disposed to be at the left end and the right end, respectively.

Referring to FIGS. 5B and 5C, the first through fifth image pickup regions 511, 512, 513, 514, and 515 respectively corresponding to the first through fifth lens elements 501, 502, 503, 504, and 505 are disposed. The first through fifth image pickup regions 511, 512, 513, 514, and 515 may have different sizes and pixel pitches from one another. In this example, the first through third image pickup regions 511, 512, and 513 have the same first size, whereas the fourth and fifth image pickup regions 514 and 515 have a second size smaller than the first size. Therefore, images obtained via the first through third image pickup regions 511, 512, and 513 have the same first angle of view, whereas images obtained via the fourth and fifth image pickup regions 514 and 515 have a second angle of view narrower than the first angle of view.

Furthermore, referring to pixels 521, 522, 523, 524, and 525 shown in FIG. 5C, the first image pickup region 511 has a first pixel pitch, the second and third image pickup regions 512 and 513 have a second pixel pitch smaller than the first pixel pitch, and the fourth and fifth image pickup regions 514 and 515 have a third pixel pitch smaller than the second pixel pitch. Therefore, the images obtained via the second and third image pickup regions 512 and 513 have higher resolutions than the image obtained via the first image pickup region 511, and the images obtained via the fourth and fifth image pickup regions 514 and 515 have higher resolutions than the images obtained via the second and third image pickup regions 512 and 513.

In the above-stated structure, an image having a first angle of view may be provided via the first lens element 501 and the first image pickup region 511, images having the first angle of view may be provided via the second and third lens elements 502 and 503 and the second and third image pickup regions 512 and 513, and images having a second angle of view may be provided via the fourth and fifth lens elements 504 and 505 and the fourth and fifth image pickup regions 514 and 515. Furthermore, depth information of an image having the first angle of view may be extracted by using two images respectively obtained via the second and third lens elements 502 and 503 and the second and third image pickup regions 512 and 513, and depth information of an image having the second angle of view may be extracted by using two images respectively obtained via the fourth and fifth lens elements 504 and 505 and the fourth and fifth image pickup regions 514 and 515.

Because precision of depth information may be deteriorated as a distance between the image pickup apparatus 500 and an object increases, the fourth and fifth lens elements 504 and 505 providing a telescopic zoom are disposed at outermost locations, such that a distance between the fourth and fifth lens elements 504 and 505 is the largest. As a result, parallax between the two images obtained via the fourth and fifth lens elements 504 and 505 may increase, and thus the deterioration of the precision of the depth information may be compensated.

Furthermore, because the image obtained via the first image pickup region 511 and the images obtained via the second and third image pickup regions 512 and 513 have the same angle of view, depth information extracted via the second and third image pickup regions 512 and 513 may be applied to the image obtained via the first image pickup region 511. Alternatively, depth information may be extracted by using all of the three images extracted via the first through third image pickup regions 511, 512, and 513. Alternatively, depth information may be extracted by using the image obtained via the first image pickup region 511 and the image obtained via the second image pickup region 512 and, at the same time, depth information may be extracted by using the image obtained via the second image pickup region 512 and the image obtained via the third image pickup region 513.

In the image pickup apparatus 500 shown in FIGS. 5A through 5C, some components may be omitted or modified as an occasion demands. For example, the second and third lens elements 502 and 503 and the second and third image pickup regions 512 and 513 may be removed, or the fourth and fifth lens elements 504 and 505 and the fourth and fifth image pickup regions 514 and 515 may be removed. In this case, the image pickup apparatus 500 may include three lens elements and three image pickup regions that are symmetrically disposed. Here, for convenience of depth information extraction, the three image pickup regions may have the same size. Alternatively, the first through third image pickup regions 511, 512, and 513 may have the same pixel pitch, and the first through third lens elements 501, 502, and 503 may have the same diameter. As a result, resolution of an image may be improved by using a resolution improving technique like the super resolution, and precision of depth information may be also improved.

Figure 6A:
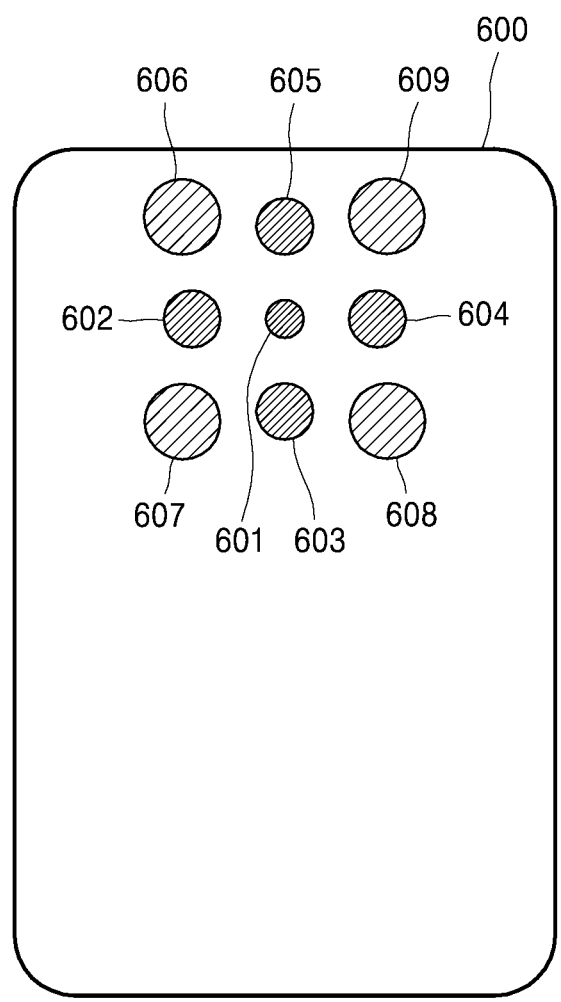
FIG. 6A is a schematic diagram showing a structure of an image pickup apparatus according to another exemplary embodiment.
Figure 6B:
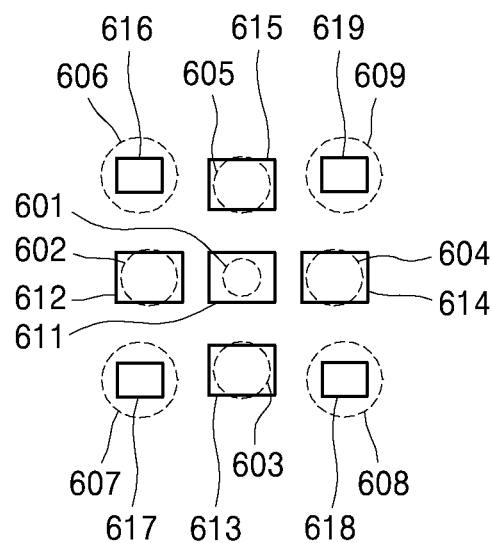
FIG. 6B is a diagram showing an example of image pickup regions of the image pickup apparatus shown in FIG. 6A.
Figure 6C:
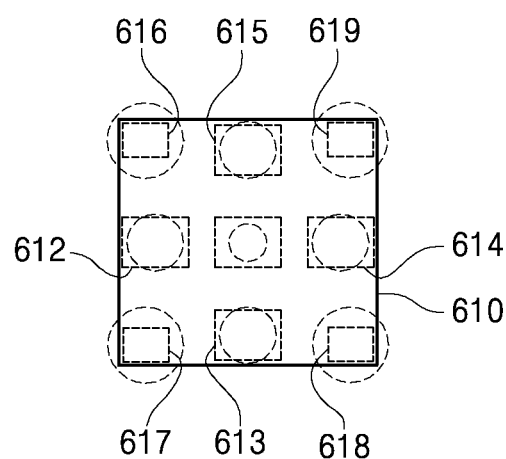
FIG. 6C is a diagram showing another example of the image pickup regions of the image pickup apparatus shown in FIG. 6A.

FIG. 6A is a schematic diagram showing a structure of an image pickup apparatus 600 according to another exemplary embodiment, FIG. 6B is a diagram showing an example of first through ninth image pickup regions 611, 612, 613, 614, 615, 616, 617, 618, and 619 of the image pickup apparatus 600 shown in FIG. 6A, and FIG. 6C is a diagram showing another example of the first through ninth image pickup regions 611, 612, 613, 614, 615, 616, 617, 618, and 619 of the image pickup apparatus 600 shown in FIG. 6A.

Referring to FIG. 6A, the image pickup apparatus 600 includes the first lens element 601 having a first diameter, the second through fifth lens elements 602, 603, 604, and 605 having a second diameter larger than the first diameter, and the sixth through ninth lens elements 606, 607, 608, and 609 having a third diameter larger than the second diameter. In other words, the first lens element 601 has the smallest diameter. Furthermore, the second through fifth lens elements 602, 603, 604, and 605 have the same diameter that is larger than the diameter of the first lens element 601, and the sixth through ninth lens elements 606, 607, 608, and 609 have the largest diameter. Therefore, the first lens element 601 has the largest F number, and the sixth through ninth lens elements 606, 607, 608, and 609 have the smallest F number.

The first through ninth lens elements 601, 602, 603, 604, 605, 606, 607, 608, and 609 are 2-dimensionally disposed in a horizontal direction and a vertical direction, when viewed from a rear, front, or surface of the image pickup apparatus 600. In this example, the second through fifth lens elements 602, 603, 604, and 605 are disposed in a horizontal direction and a vertical direction around the first lens element 601, and the sixth through ninth lens elements 606, 607, 608, and 609 are disposed in diagonal directions around the first lens element 601. In other words, the sixth through ninth lens elements 606, 607, 608, and 609 are respectively disposed on four vertices of a quadrangle on the rear, front, or surface of the image pickup apparatus, the second through fifth lens elements 602, 603, 604, and 605 are respectively disposed at the centers of four sides of the quadrangle, and the first lens element 601 is disposed in the center of the quadrangle.

Furthermore, referring to FIG. 6B, the first through ninth image pickup regions 611, 612, 613, 614, 615, 616, 617, 618, and 619 respectively corresponding to the first through ninth lens elements 601, 602, 603, 604, 605, 606, 607, 608, and 609 are disposed. The first through ninth image pickup regions 611, 612, 613, 614, 615, 616, 617, 618, and 619 may have different sizes and pixel pitches from one another. In this example, the first through fifth image pickup regions 611, 612, 613, 614, and 615 have the same first size, whereas the sixth through ninth image pickup regions 616, 617, 618, and 619 have a second size smaller than the first size. Therefore, images obtained via the first through fifth image pickup regions 611, 612, 613, 614, and 615 have the same first angle of view, whereas images obtained via the sixth through ninth image pickup regions 616, 617, 618, and 619 have a second angle of view narrower than the first angle of view. Although not shown, the first through fifth image pickup regions 611, 612, 613, 614, and 615 may have a first pixel pitch, whereas the sixth through ninth image pickup regions 616, 617, 618, and 619 may have a second pixel pitch smaller than the first pixel pitch.

FIG. 6B shows the example in which the first through ninth image pickup regions 611, 612, 613, 614, 615, 616, 617, 618, and 619 respectively include separate image sensors. Referring to FIG. 6C, the first through ninth image pickup regions 611, 612, 613, 614, 615, 616, 617, 618, and 619 are logically divided regions in a single image sensor 610. In this case, the first through fifth image pickup regions 611, 612, 613, 614, and 615 have the same first size, whereas the sixth through ninth image pickup regions 616, 617, 618, and 619 have the same second size smaller than the first size. Although not shown, the first pickup region 611 may have a first pixel pitch, second through fifth image pickup regions 612, 613, 614, and 615 may have the same second pixel pitch smaller than the first pixel pitch, and the sixth through ninth image pickup regions 616, 617, 618, and 619 may have the same third pixel pitch smaller than the second pixel pitch.

In the above-stated structure, pairs of the second through fifth lens elements 602, 603, 604, and 605 and pairs of the sixth through ninth lens elements 606, 607, 608, and 609 have not only horizontal parallaxes, but also vertical parallaxes. Therefore, depth information may be extracted not only in a horizontal direction, but also in a vertical direction. Here, the sixth through ninth lens elements 606, 607, 608, and 609 are disposed at the outermost locations, such that distances between the sixth through ninth lens elements 606, 607, 608, and 609 providing a telescopic zoom function are the largest. Furthermore, resolutions of five images having a first angle of view obtained via the first through fifth image pickup regions 611, 612, 613, 614, and 615 may be improved by using the super resolution technique, and resolutions of four images having a second angle of view obtained via the sixth through ninth image pickup regions 616, 617, 618, and 619 may be improved by using the super resolution technique. Furthermore, by using the super resolution technique, an image may be smoothly processed when a digital zoom function for generating an image having an angle of view between a first angle of view and a second angle of view is performed.

Figure 7:
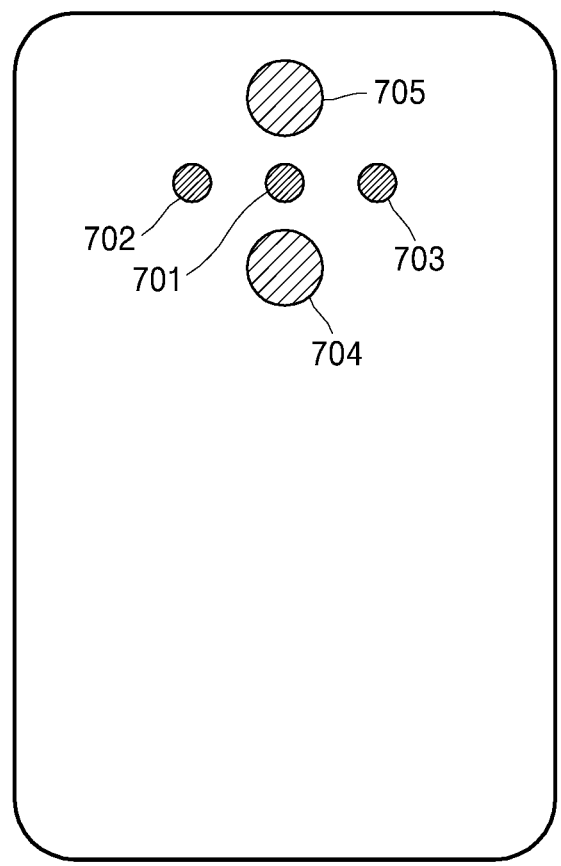
FIG. 7 is a schematic diagram showing a structure of an image pickup apparatus according to another exemplary embodiment.

FIG. 7 is a schematic diagram showing a structure of an image pickup apparatus 700 according to another exemplary embodiment. Referring to FIG. 7, the image pickup apparatus 700 includes first through third lens elements 701, 702, and 703 having a first diameter and fourth and fifth lens elements 704 and 705 having a second diameter larger than the first diameter. Therefore, the first through third lens elements 701, 702, and 703 have the same F number, whereas the fourth and fifth lens elements 704 and 705 have the same F number. Furthermore, the F number of the fourth and fifth lens elements 704 and 705 is smaller than the F number of the first through third lens elements 701, 702, and 703. Although not shown, same as in the above-stated exemplary embodiment, sizes of image pickup regions respectively corresponding to the first through third lens elements 701, 702, and 703 may be larger than sizes of image pickup regions respectively corresponding to the fourth and fifth lens elements 704 and 705.

According to the exemplary embodiment, the first through third lens elements 701, 702, and 703 are linearly disposed in a horizontal direction (a first direction), whereas the fourth and fifth lens elements 704 and 705 are linearly disposed in a vertical direction (a second direction perpendicular to the first direction), when viewed from a rear, front, or surface of the image pickup apparatus 700. In this example, the fourth lens element 704 is disposed below the first through third lens elements 701, 702, and 703, whereas the fifth lens element 705 is disposed above the first through third lens elements 701, 702, and 703.

In the above-stated structure, because the first through third lens elements 701, 702, and 703 have parallaxes in a horizontal direction, depth information in a horizontal direction may be extracted by using three images obtained via the first through third lens elements 701, 702, and 703. Furthermore, because the fourth and fifth lens elements 704 and 705 have a parallax in a vertical direction, depth information in a vertical direction may be extracted by using two images obtained via the fourth and fifth lens elements 704 and 705.

Furthermore, images having a first angle of view may be obtained via the first through third lens elements 701, 702, and 703, whereas image having a second angle of view narrower than the first angle of view may be obtained via the fourth and fifth lens elements 704 and 705. Here, resolutions of the three images having the first angle of view obtained via the first through third lens elements 701, 702, and 703 may be improved by using the super resolution technique, and resolutions of the two images having the second angle of view obtained via the fourth and fifth lens elements 704 and 705 may be improved by using the super resolution technique. By using the super resolution technique, an image may be smoothly processed when a digital zoom function for generating an image having an angle of view between a first angle of view and a second angle of view is performed.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A mobile device comprising:
a first lens having a first aperture;
a second lens having a second aperture larger than the first aperture;
a first sensor of a first size, the first sensor being disposed in correspondence to the first lens; and
a second sensor of a second size smaller than the first size, the second sensor being disposed in correspondence to the second lens,
wherein the mobile device is configured to extract depth information from a first image that is obtained via the first lens and the first sensor and from a second image that is obtained via the second lens and the second sensor,
the first lens has a first F number that is determined by the first aperture,
the second lens has a second F number that is determined by the second aperture and is different from the first F number,
the first lens and the second lens are disposed in a same side of the mobile device, and
a second resolution of the second image is higher than a first resolution of the first image.

2. The mobile device of claim 1, wherein the first sensor has a first pixel pitch, and
the second sensor has a second pixel pitch smaller than the first pixel pitch.

3. The mobile device of claim 1, wherein the first lens is configured to provide a first angle of view, and
the second lens is configured to provide a second angle of view narrower than the first angle of view.

4. The mobile device of claim 1, wherein the first sensor is locationally separated from the second sensor.

5. The mobile device of claim 1, wherein the first sensor and the second sensor are logically divided regions in a single image sensor.

6. A mobile device comprising:
a first lens having a first aperture;
a second lens having a second aperture larger than the first aperture;
a first sensor of a first size, the first sensor being disposed in correspondence to the first lens, and the first sensor having a first pixel pitch; and
a second sensor of a second size smaller than the first size, the second sensor being disposed in correspondence to the second lens, and the second sensor having a second pixel pitch smaller than the first pixel pitch,
the first lens has a first F number that is determined by the first aperture,
the second lens has a second F number that is determined by the second aperture and is different from the first F number,
the first lens and the second lens are disposed in a same side of the mobile device, and
a second resolution of a second image that is obtained via the second lens and the second sensor is higher than a first resolution of a first image that is obtained via the first lens and the first sensor.

7. The mobile device of claim 6, wherein the mobile device is configured to extract depth information from the first image and the second image.

8. The mobile device of claim 6, wherein the first lens is configured to provide a first angle of view, and
the second lens is configured to provide a second angle of view narrower than the first angle of view.

9. The mobile device of claim 6, wherein the first size of the first sensor is a size of the first sensor from a top view, and
the second size of the second sensor is a size of the second sensor from the top view.

10. The mobile device of claim 1, wherein the first F number is between 1.5 to 2 times larger than the second F number.

11. The mobile device of claim 1, wherein a size of a first light spot that is formed by the first lens is larger than a size of a second light spot that is formed by the second lens.

12. The mobile device of claim 1, wherein the mobile device is further configured to form a modified image by replacing a center portion of the first image with the second image, and
the center portion of the first image has a same angle of view as the second image.

13. The mobile device of claim 6, wherein the first F number is between 1.5 to 2 times larger than the second F number.

14. The mobile device of claim 6, wherein a size of a first light spot that is formed by the first lens is larger than a size of a second light spot that is formed by the second lens.

15. The mobile device of claim 6, wherein the mobile device is further configured to form a modified image by replacing a first center portion of the first image with the second image, and the first center portion of the first image has a same angle of view as the second image.

16. The mobile device of claim 15, wherein the mobile device is further configured to:

extract first depth information for a peripheral angle of view, using a peripheral portion of the first image; and extract second depth information for a center angle of view, using a second center portion of the second image.

* * * * *